(12) United States Patent
Pavlyushchik

(10) Patent No.: US 8,713,631 B1
(45) Date of Patent: Apr. 29, 2014

(54) SYSTEM AND METHOD FOR DETECTING MALICIOUS CODE EXECUTED BY VIRTUAL MACHINE

(71) Applicant: Kaspersky Lab ZAO, Moscow (RU)

(72) Inventor: Mikhail A. Pavlyushchik, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 13/767,391

(22) Filed: Feb. 14, 2013

(30) Foreign Application Priority Data

Dec. 25, 2012 (RU) ................................ 2012156443

(51) Int. Cl.
G06F 21/53 (2013.01)
G06F 9/455 (2006.01)

(52) U.S. Cl.
CPC ...... *G06F 21/53* (2013.01); *G06F 2009/45587* (2013.01)
USPC ................................ 726/1; 726/23

(58) Field of Classification Search
CPC ................ G06F 2009/45587; G06F 21/53
USPC ...................................... 726/1, 23
See application file for complete search history.

(56) References Cited

U.S. PATENT DOCUMENTS

| 7,007,301 | B2 | 2/2006 | Crosbie et al. |
| 7,263,690 | B1 | 8/2007 | Shapiro |
| 8,201,246 | B1 | 6/2012 | Wu et al. |
| 8,225,317 | B1 | 7/2012 | Chiueh et al. |
| 8,239,939 | B2 | 8/2012 | Dunagan et al. |
| 2005/0076186 | A1 | 4/2005 | Traut |
| 2009/0320011 | A1 | 12/2009 | Chow et al. |
| 2010/0122343 | A1 | 5/2010 | Ghosh et al. |
| 2010/0257608 | A1 | 10/2010 | Jeong et al. |
| 2011/0197256 | A1 | 8/2011 | Sharkey et al. |
| 2011/0219447 | A1 | 9/2011 | Horovitz et al. |

FOREIGN PATENT DOCUMENTS

WO WO9727536 7/1997

OTHER PUBLICATIONS

Payne et al., "Lares: An Architecture for Secure Active Monitoring Using Virtualization". Georgia Institute of Technology. Atlanta, Georgia. Mar. 2008.
"Java and Java Virtual Machine security vulnerabilities and their exploitation techniques" presented by The Last Stage of Delirium Research Group. Poland. http://LSD-PLaNet. Black Hat Briefings. Singapore. Oct. 3-4, 2002.
Chiueh et al., "Stealthy Deployment and Execution of In-Guest Kernel Agents", Symantec Research Labs. Jun. 2009.
Sharif et al., "Secure In-VM Monitoring Using Hardware Virtualization" Georgia Institute of Technology. Nov. 9-13, 2009.

*Primary Examiner* — Jacob Lipman
(74) *Attorney, Agent, or Firm* — Patterson Thuente Pedersen, PA

(57) ABSTRACT

Protection against a malicious set of program instructions (e.g., a malicious program) executable by a process virtual machine. The program instructions of process virtual machine are augmented to establish an exception monitoring module within the process virtual machine. When the process virtual machine executes a subject set of program instructions, the exception monitoring module detects a security policy violation exception occurring as a result. In response thereto, the exception monitoring module gathers context information representing circumstances surrounding the occurrence of the exception, and provides the context information for analysis of a presence of malicious code. The exception monitoring module determines, based on a result of the analysis, whether to permit further execution of the subject set of program instructions by the process virtual machine.

23 Claims, 5 Drawing Sheets

```
java.lang.System.setSecurityManager(Unknown Source)
sun.reflect.NativeMethodAccessorImpl.invoke0(Native Method)
sun.reflect.NativeMethodAccessorImpl.invoke(Unknown Source)
sun.reflect.DelegatingMethodAccessorImpl.invoke(Unknown Source)
java.lang.reflect.Method.invoke(Unknown Source)
sun.reflect.misc.Trampoline.invoke(Unknown Source)
sun.reflect.misc.MethodUtil.invoke(Unknown Source)
sun.org.mozilla.javascript.internal.MemberBox.invoke(Unknown Source)
sun.org.mozilla.javascript.internal.NativeJavaMethod.call(Unknown Source)
sun.org.mozilla.javascript.internal.Interpreter.interpretLoop(Unknown Source)
sun.org.mozilla.javascript.internal.Interpreter.interpret(Unknown Source)
sun.org.mozilla.javascript.internal.InterpretedFunction.call(Unknown Source)
sun.org.mozilla.javascript.internal.ContextFactory.doTopCall(Unknown Source)
sun.org.mozilla.javascript.internal.ScriptRuntime.doTopCall(Unknown Source)
com.sun.script.javascript.ExternalScriptable.getDefaultValue(Unknown Source)
sun.org.mozilla.javascript.internal.ScriptRuntime.toString(Unknown Source)
sun.org.mozilla.javascript.internal.NativeError.getString(Unknown Source)
sun.org.mozilla.javascript.internal.NativeError.js_toString(Unknown Source)
sun.org.mozilla.javascript.internal.NativeError.toString(Unknown Source)
javax.swing.DefaultListCellRenderer.getListCellRendererComponent(Unknown Source)
javax.swing.plaf.basic.BasicListUI.updateLayoutState(Unknown Source)
javax.swing.plaf.basic.BasicListUI.maybeUpdateLayoutState(Unknown Source)
javax.swing.plaf.basic.BasicListUI.getPreferredSize(Unknown Source)
javax.swing.JComponent.getPreferredSize(Unknown Source)
java.awt.FlowLayout.layoutContainer(Unknown Source)
java.awt.Container.layout(Unknown Source)
java.awt.Container.doLayout(Unknown Source)
java.awt.Container.validateTree(Unknown Source)
java.awt.Container.validate(Unknown Source)
sun.plugin.util.GrayBoxPainter$2.run(Unknown Source)
java.awt.event.InvocationEvent.dispatch(Unknown Source)
java.awt.EventQueue.dispatchEvent(Unknown Source)
java.awt.EventDispatchThread.pumpOneEventForFilters(Unknown Source)
java.awt.EventDispatchThread.pumpEventsForFilter(Unknown Source)
java.awt.EventDispatchThread.pumpEventsForHierarchy(Unknown Source)
java.awt.EventDispatchThread.pumpEvents(Unknown Source)
java.awt.EventDispatchThread.run(Unknown Source)
```

*FIG.4*

SYSTEM AND METHOD FOR DETECTING MALICIOUS CODE EXECUTED BY VIRTUAL MACHINE

CLAIM TO PRIORITY

This Application claims the benefit of Russian Federation Patent Application No. 2012156443 filed Dec. 25, 2012, the disclosure of which is incorporated by reference herein.

FIELD OF THE INVENTION

The invention relates generally to information processing and security and, more particularly, to detecting malicious software whose code is executed by a virtual machine.

BACKGROUND OF THE INVENTION

Today, a dramatic increase is observed in the number of computer threats whose program code is executed by a virtual machine (for example, Java Virtual Machine, Common Language Runtime, ActionScript Virtual Machine). Exploits are the most dangerous of such threats. An exploit is a fragment of a program code or a sequence of commands which uses vulnerabilities in software and is used to attack a computer system. The danger lies not in the exploits themselves, but in the payload that they carry with them. The payload of an exploit is a functionality deployed by the offender, which, when a vulnerability is exploited on a system under attack, results in unauthorized activation of the functionality. Downloads of malicious software can be cited as an example of such functionality. Exploits can be used either independently, to test computer systems security, or together with malicious software.

From the wide variety of exploits, special note should be given to those that require a virtual machine to execute their code. This kind of exploits is most often used for attacks and is the most dangerous, as it is difficult to detect.

There are two main approaches for countering this type of threat. The first method involves elimination of the vulnerability used by the exploit. The second method involves using special tools for detecting the presence of exploits and stopping their activity. Such tools can be either built in the software itself (for example, the Java virtual machine security model) or provided externally. The first approach is reliable and addresses a root cause of the problem, but it has two significant drawbacks. For one, a rather long period of time passes from the moment the vulnerability is found to the moment the corrected software version is issued. The users of the vulnerable product remain unprotected throughout this period. Another drawback is that the first approach does not provide any protection from the so-called "zero day" vulnerabilities, i.e., threats that use an error or a vulnerability in the application or the operating system and arise immediately after the vulnerability is found, but before the relevant upgrade is issued.

The second approach avoids these drawbacks, but its reliability depends on the quality of its technical realization, and it should be noted that such protection tools can themselves be vulnerable. The most widespread solutions which use this approach are detection of exploits using heuristic rules and signature analysis (e.g., analysis of whether the analyzed code is identical to samples of the code of known computer threats), and built-in virtual machine security tools. The use of signatures is generally suitable for detection of known exploits. However, if the attacking code is modified, this solution will turn out to be useless.

The heuristic analysis implementation does not have this deficiency, but it can be inefficient in cases where there is a more elaborate code modification (e.g., encryption/obfuscation), where there is a change of the malicious code's algorithm, or where techniques to avoid code emulation are deployed.

A virtual machine is a software-based computing environment which runs on a hardware platform and operating system of a computer system. The virtual machine establishes a level of abstraction to achieve independence from the hardware platform on which the virtual machine is actually executed. Virtual machines have their own built-in security models. Special note should be given to the Java Virtual Machine (JVM) security model; which has four components: a class file verifier, a class loader, a security manager and the JVM architecture itself. Since Java byte code can be interpreted, it is possible to control an array indexes making it possible to avoid buffer overflows, which represent the most typical and dangerous type of software execution error. There are also built-in mechanisms for processing exceptions allow to efficiently solve arising conflicts, while a trash collector cleans unused memory, preventing the offender from viewing the "trash" memory blocks, which may contain useful information.

The security manager, the most important element in the security model for JVM, is a component which grants rights to applications, in accordance with the established security policy. If a situation arises where an application attempts to perform a privileged operation, the security manager checks the application's rights and determines the legitimacy of such behavior. The default security manager is the Java-class java.lang.SecurityManager; which includes several methods for checking operations critical to the security policy.

Recently, the number of directed attacks on JVM using exploits has dramatically increased. As these attacks have shown, the security model proposed by Java creators has, in practice, serious deficiencies in its implementation. These deficiencies are now actively used by offenders in their attacks.

In view of the above, known approaches for detection of exploits either have limitations in their application, or have deficiencies that create a security risk and generally do not provide adequate protection.

A practical solution is therefore needed that addresses at least some of these challenges, and that potentially, has even wider applicability.

SUMMARY OF THE INVENTION

One aspect of the invention is directed to an automated computer-implemented method for protecting against a malicious set of program instructions that are executable by a process virtual machine. The process virtual machine comprises program instructions executable on a computer system having a hardware platform and an operating system. The method includes:

augmenting, by an automated augmentation process executing on the computer system, the program instructions of the process virtual machine to establish an exception monitoring module within the process virtual machine;

executing, via the process virtual machine, the subject set of program instructions;

detecting, by the exception monitoring module, an exception occurring as a result of the execution of the subject set of program instructions, wherein the exception represents an occurrence of an event determined as having potential to violate a predefined security policy;

in response to a detection of an occurrence of the exception, gathering, by the exception monitoring module, context information from the process virtual machine, the context information representing circumstances surrounding the occurrence of the exception;

providing, by the exception monitoring module, the context information to be subjected to analysis for a presence of the malicious set or program instructions; and determining, by the exception monitoring module, based on a result of the analysis, whether to permit further execution of the subject set of program instructions by the process virtual machine.

In a related aspect of the invention, a system for protecting against malicious functionality of a subject set of program instructions, includes a computer system having a hardware platform and an operating system executable on the hardware platform. A process virtual machine module is executable on the computer system and, when executed, forms a virtual execution environment in which the subject set of program instructions are executable. A control module is executable on the computer system that augments the process virtual machine to insert an exception monitoring module therein. The exception monitoring module is configured to detect an exception occurring as a result of execution of the subject set of program instructions, with the exception representing an occurrence of an event determined as having potential to violate a predefined security policy. In response to a detection of an occurrence of the exception, the exception monitoring module gathers context information representing circumstances surrounding the occurrence of the exception. The context information is provided to be subjected to analysis for a presence of the malicious code (e.g., to an analysis module that can be executing locally or remotely relative to the computer system. The exception monitoring module determines, based on a result of the analysis, whether to permit further execution of the subject set of program instructions by the process virtual machine.

BRIEF DESCRIPTION OF THE DRAWINGS

The invention may be more completely understood in consideration of the following detailed description of various embodiments of the invention in connection with the accompanying drawings, in which:

FIG. 4 is a listing of a Java Virtual Machine's call stack, from which information is collected for analysis as part of the operation of the embodiment of FIG. 3.

Figure 1:
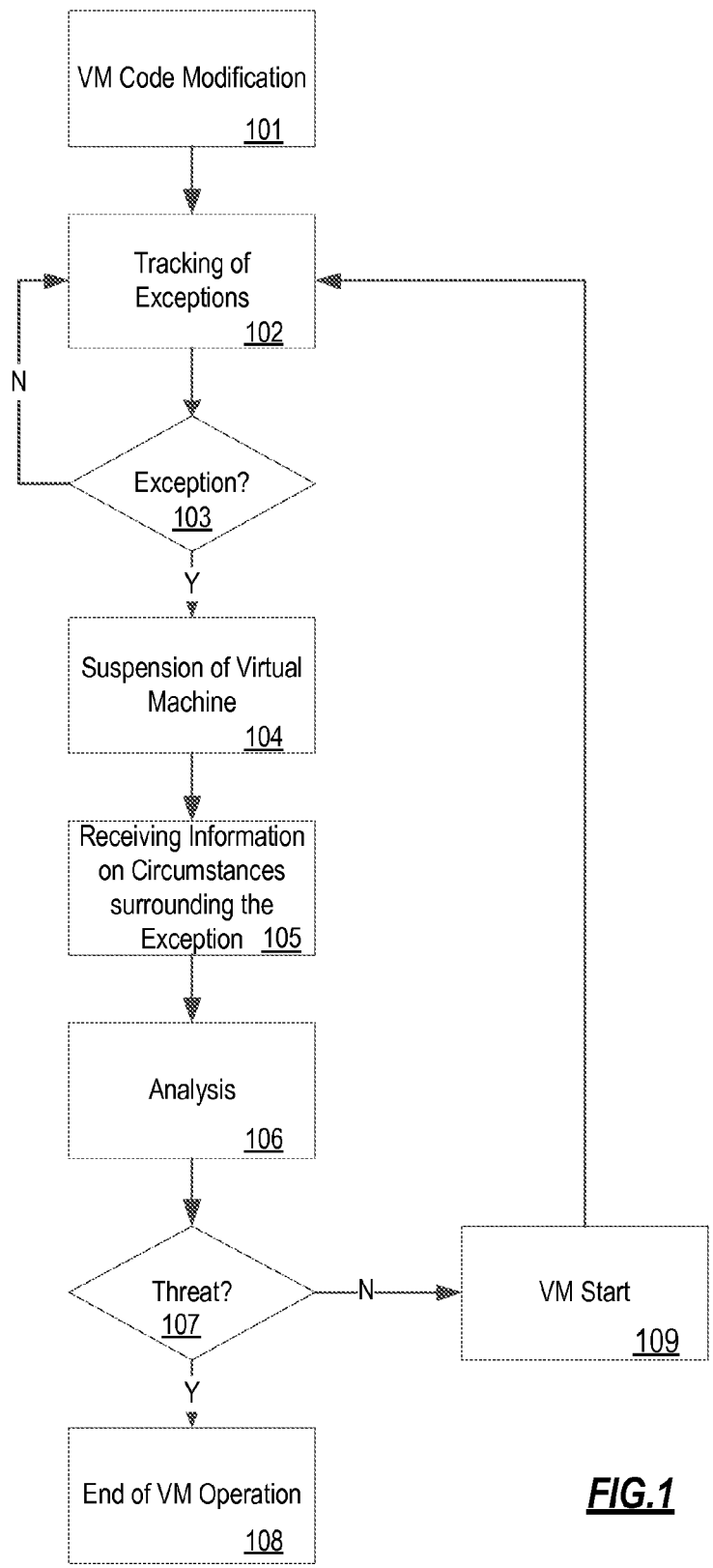
FIG. 1 is a flow diagram illustrating a method for detecting threats in a piece of software code to be executed by a virtual machine according to one embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

In a practical realization, the system and method of the invention are implemented, and carried out, respectively, using computer machinery. The computer-implemented system can be implemented in one physical machine, or can be distributed among multiple physical machines, such as by role or function, or by process thread in the case of a cloud computing distributed model. In various embodiments, aspects of the invention can be configured to run in system virtual machines that in turn are executed on one or more physical machines. It will be understood by persons of skill in the art that features of the invention may be realized by a variety of different suitable machine implementations.

In order to detect a malicious piece of code and to block its execution by a virtual machine, aspects of the invention are directed to checking the virtual machine and the code that it interprets. These aspects of the invention relate to process virtual machines, also known as application virtual machines, which serve to provide an application execution environment, such as a Java Virtual Machine (JVM), or the Common Language Runtime (CLR). One of the ways in which this is facilitated according to one type of embodiment involves augmenting the program code of the virtual machine itself.

FIG. 1 depicts an algorithm for detecting a presence of malicious piece of code, such as a harmful program, applet, or the like, or an infected portion of an otherwise benign program in a subject set of program instructions executable by a virtual machine. At block 101, the virtual machine's program code is augmented by an automated augmentation process. According to one embodiment, the augmentation process is executed on the same computer system on which the virtual machine executes. The augmentation process inserts a specialized supplemental code into the virtual machine's program instructions. This supplemental code adds functionality for checking the execution of the code by the virtual machine, tracking virtual machine events, stopping the operation of the virtual machine, starting or re-starting the operation, etc.

The supplemental code according to this embodiment is particularized to the specific type of virtual machine that it augments.

At 102, the virtual machine's exceptions are tracked. Events occurring in the course of operation of the virtual machine during execution of the subject program code are checked at 103 to determine if they constitute an exception; if an event caused by the virtual machine is an exception, the virtual machine's operation will be suspended at 104. The term exceptions in the present context refers to critical events that have the potential to cause violations of the rules set by the security policy. The applicable security policy can be defined by any suitable technique, e.g., in the augmentation code, or elsewhere in the configuration file(s) of a security application, operating system, etc.

While the virtual machine is stopped, information on the circumstances surrounding the exception is gathered at 105 and then analyzed at 106. In various embodiments, the circumstances surrounding the exception include such items as how, or by what, the exception was caused, what preceded the occurrence of the critical event leading to the exception, etc. In one embodiment, the analysis of the circumstances surrounding the exception is performed through comparison of the information indicating the circumstances surrounding the exception at 105 with a template (for example, comparison of the call stack preceding the exception with the call stack listed in the template). The analysis is performed with the purpose of detecting a threat in the code that caused the exception. Decision 107 tests whether the code contains a threat and, if the case is affirmative, the execution of the code by the virtual machine will be terminated at 108; on the other hand, if the code is safe, the virtual machine will be allowed to continue operation. Accordingly, at 109, the virtual machine is started again.

Figure 2:
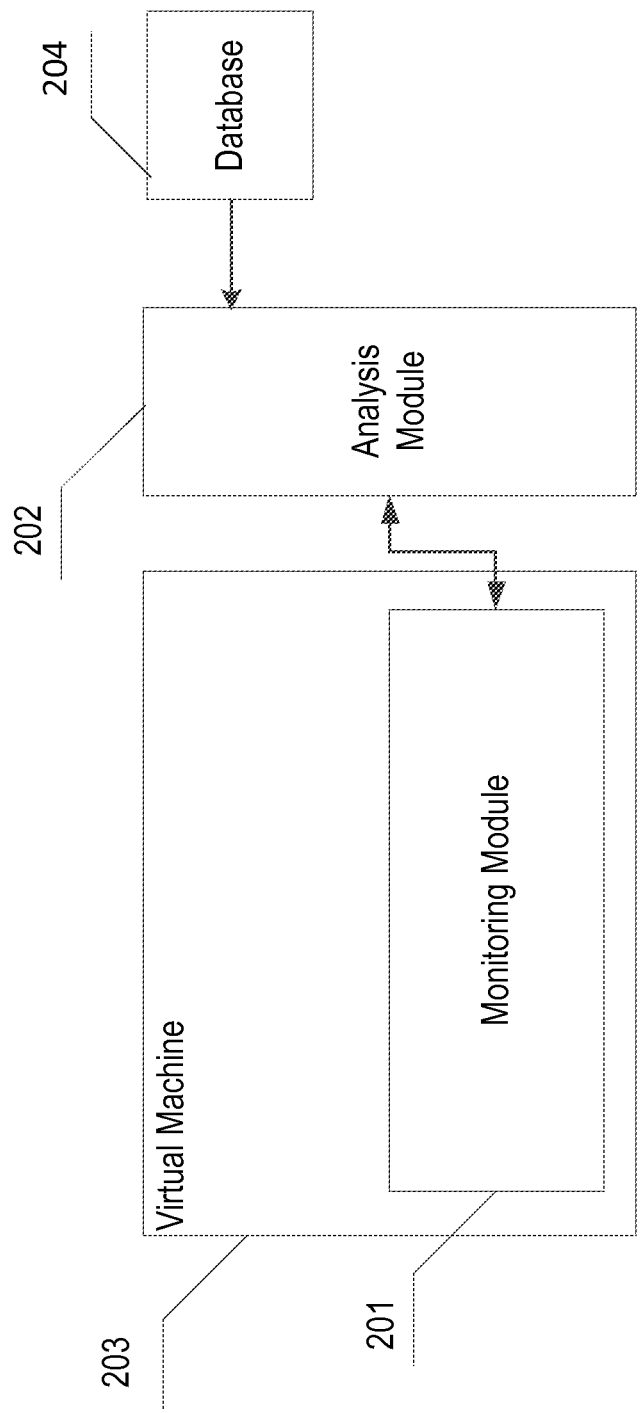
FIG. 2 is a block diagram depicting an example of a system for detecting threats posed by a piece of software code to be executed by a virtual machine according to one embodiment of the invention.

FIG. 2 is a high-level diagram illustrating a virtual machine and a protection mechanism added to it according to one embodiment that includes a specialized monitoring module operatively coupled with an analysis module. The term module as used herein means a real-world device, component, or arrangement of components implemented using hardware, such as by an application specific integrated circuit (ASIC) or field-programmable gate array (FPGA), for example, or as a combination of hardware and software, such as by a microprocessor-based system and a set of program instructions stored in a non-transitory storage medium that configure the microprocessor-based system to implement the particular functionality, which (while being executed) transform the microprocessor system into a special-purpose device for carrying out the module's stated functionality. A module can also be implemented as a combination of the two, with certain functions facilitated by hardware alone, and other functions facilitated by a combination of hardware and software. In certain implementations, at least a portion, and in some cases, all, of a module can be executed on the processor(s) of one or more computers that execute an operating system, system programs, and application programs, while also implementing the module using multitasking, multithreading, distributed (e.g., cloud) processing where appropriate, or other such techniques. Accordingly, each module can be realized in a variety of suitable configurations, and should generally not be limited to any particular implementation exemplified herein, unless such limitations are expressly called out or clearly implied from the context in which the term appears. Indeed, the virtual machine may itself be regarded as a module.

According to the embodiment depicted in FIG. 2, monitoring module 201 is incorporated in the code (i.e., program instructions) of virtual machine 203. Monitoring module 201 tracks exceptions that occur during operation of the virtual machine 203 as it executes the code of a subject set of program instructions and, if exceptions occur, monitoring module 201 collects exception context information about the circumstances surrounding the exception, and then transfers the collected information to analysis module 202. The analysis module 202 is implemented in this embodiment as a distinct module from virtual machine 203. Analysis module 202, in various embodiments, can be realized as an application program (or component thereof) that runs natively in the operating system, in a separate virtual execution environment, on a remote computer system (e.g., security server), or in distributed fashion on multiple different computer systems, e.g., in a cloud computing model. Analysis module 202 compares the received context with a set of one or more templates contained in a regularly-updated database 204. Each template represents a pattern of events associated with malicious activity. Based on the comparison, the analysis module 202 makes a decision regarding the safety of the code that caused the exception and reports the conclusion to monitoring module 201. The monitoring module 201, depending on the decision by the analysis module 202, either allows the virtual machine 203 to continue execution of the code, or terminates its operation.

Figure 3:
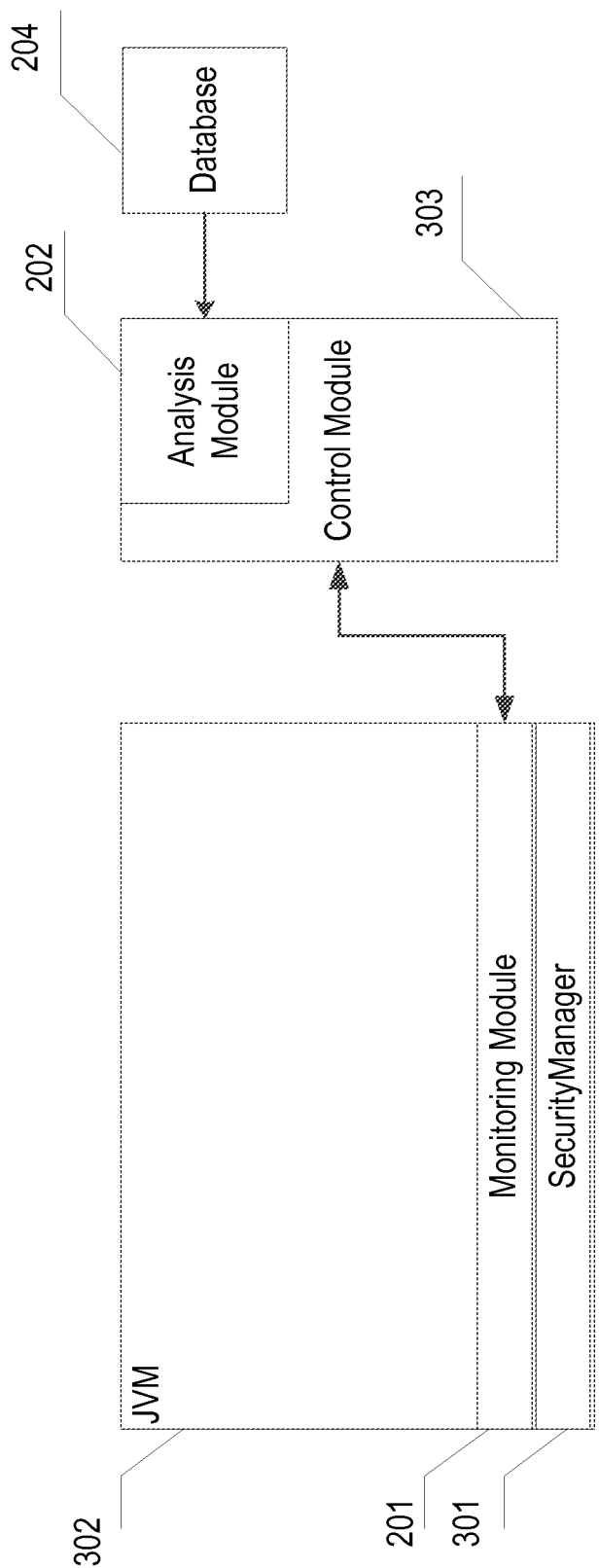
FIG. 3 is a block diagram depicting an example embodiment of a system for detecting threats in a piece of code executed by a virtual machine that is a augmentation of Java Virtual Machine (JVM).

FIG. 3 is a block diagram of a particular realization of the invention according to one embodiment in which the program code of JVM 302 is augmented by supplemental code that implements monitoring module 201 in the address space of virtual machine 302 in order to detect threats. In this embodiment, the insertion of the supplemental code to JVM 302 is performed by control module 303, which is persistently loaded in the system and tracks the start of the virtual machine's operation. In one embodiment, at the start of the JVM in the system, control module 303 augments the virtual machine's code by inserting a specialized monitoring module 201 into the JVM.

In one embodiment, monitoring module 201 is realized as an added extension to an existing built-in security manager 301. Built-in security manager 301 can be of a conventional type, i.e., having drawbacks such as those identified above. In this embodiment, the augmentation of the code of JVM 302 entails function overloading a number of SecurityManager class methods. Function overloading in this context refers to adding additional functionality to these class methods that is invoked when those methods are called. See, for example, http://en.wikipedia.org/w/index.php?title=Function_overloading&oldid=525790025, incorporated by reference herein.

The monitoring module 201 tracks the exceptions that typically occur in as a result of execution of malicious code (access to file system, communications over a network, etc.) and, if such an exception occurs, sends the circumstances surrounding the exception to analysis module 202 via control module 303. Analysis module 202 makes a determination as to the safety of the behavior of the code which caused the exception based on the analysis of the data received from the monitoring module 201. If the behavior is deemed to be malicious, the control module 303 instructs the monitoring module 201 to end the execution of the code. In order to make the determination of maliciousness, a comparison is carried out by the analysis module 202 using templates contained in regularly-updated updated database 204.

In one particular embodiment, the above-described system can be used to detect exploits—for example, those that use the CVE-2011-3544 vulnerability. This vulnerability is based on an error in the class sun.org.mozilla.javascript.internal.NativeError. Exploitation of this vulnerability allows the offender to execute an arbitrary code on a remote machine. To detect a piece of malicious code exploiting this vulnerability, the JVM code is first augmented by function overloading the checkPermission and checkExec methods of the java.lang.SecurityManager class. Injection of the augmentation code into the JVM can be performed using -Xbootclasspath/p:<path> parameter of JAVA.EXE. By pointing to a JAR class containing implementation of specific class, this approach overrides standard implementation. Thus, adding this option pointing to java2sw.jar file overrides the standard SecurityManager implementation with an extended version.

In a related embodiment, the augmentation code is injected into a JAVA.EXE process each time it is executed as part of a Java. For example, if JVM is executed as a plugin, the injection of augmentation code can be made in response to detection of the start of the Java plugin.

Monitoring module 201 tracks the exception typical for a code exploiting this vulnerability—for example, an attempt to disable a protected execution environment (i.e., sandbox), which can be observed as a setSecurityManager event, for example. If such an event occurs, the execution of the code by the virtual machine will be stopped, and monitoring module 201 will collect information on the exception's context, including the call stack of the current thread, an example of which is provided in FIG. 4. All collected information is sent to the analysis module 202, which contains a stack frame analysis rule for detection of threats that use the CVE-2011-3544 vulnerability. A stack frame is sent to the analysis module's input; the stack frame is checked for a call for methods typical for the above-described threat, namely, the java.lang.System.setSecurityManager and sun.org.mozilla.javascript.internal.NativeError.toString methods. In this example, if the frame contains these methods, the code being executed is deemed to be malicious, and the control module 303 sends a command to the monitoring module to stop the operation of the virtual machine.

In a related embodiment, the analysis system, instead of using the updated database for the evaluation of the code under examination, may perform detection based on rigidly set templates.

In another related embodiment, the augmentation of the virtual machine may be performed before the virtual machine is loaded into the memory for execution (for example, when the virtual machine code is still stored in a non-volatile storage medium such as a hard drive).

In another related embodiment, monitoring module 201 is used to collect statistical information on the detected threats; and this information is be used to fill the database 204.

Figure 5:
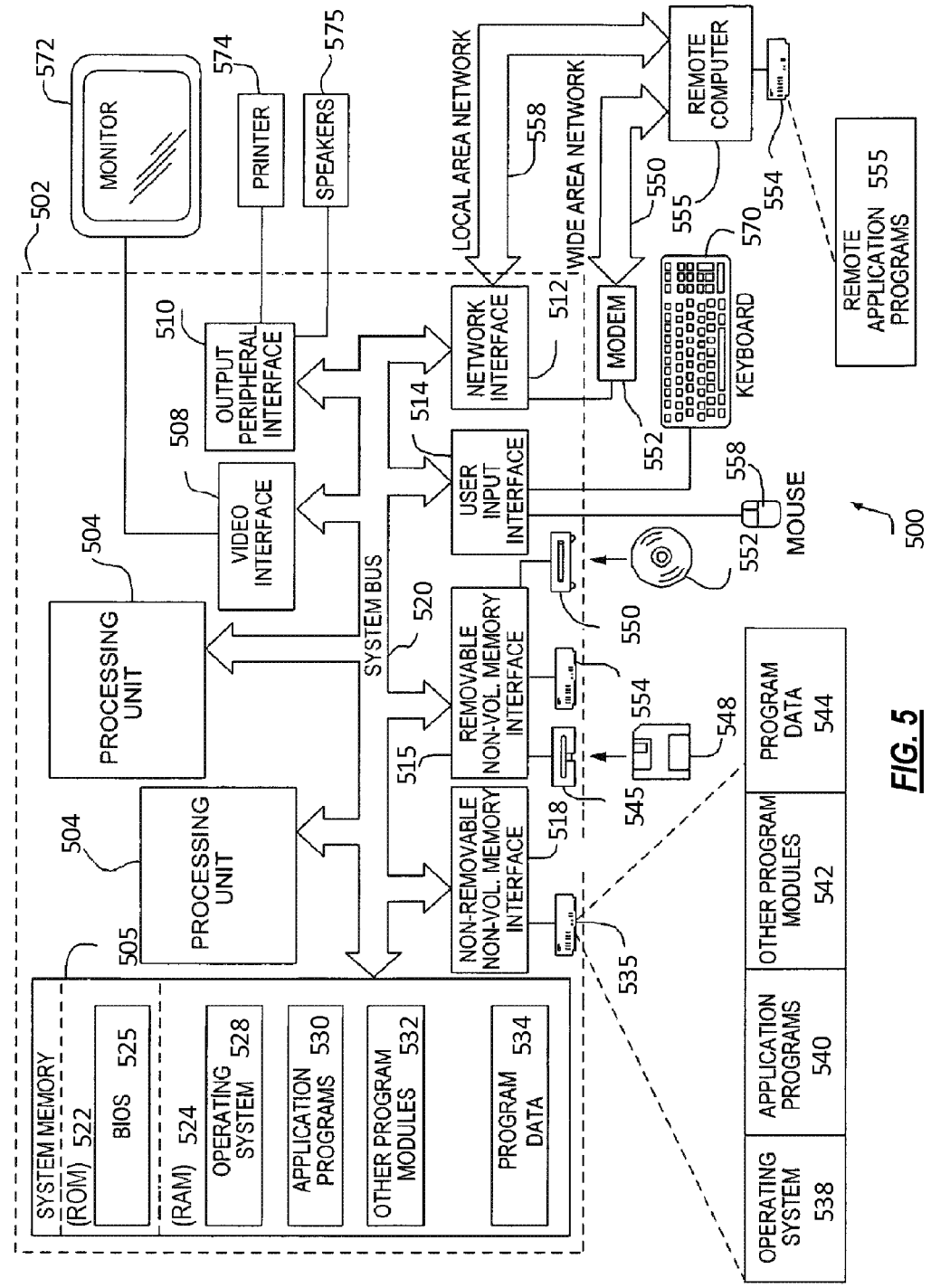
FIG. 5 is a block diagram depicting a general-purpose computer system on which aspects of the invention can be implemented.

FIG. 5 is a block diagram illustrating an exemplary general-purpose computer system on which one or more functional modules of the system can be implemented. Personal computer or server 520 includes a hardware platform that includes a processor 521, system memory 522 and system bus 523, which contains various system components, including memory associated with processor 521. The system bus 523 is implemented as any known in bus structure, including a bus memory, bus memory controller, peripheral bus and local bus, which can interact with any other bus architecture. System memory includes read only memory (ROM) 524, and random access memory (RAM) 525. Basic input/output system (BIOS), containing the main procedures that ensure the transfer of information between the elements of the personal computer 520, for example, at boot time using the ROM 524.

The personal computer 520 contains a hard drive 527 for reading and writing, magnetic disk drive 528 for reading and writing to removable magnetic disk 529 and an optical drive 530 for reading and writing to removable optical disk 531, such as CD-ROM, DVD-ROM or other optical media. The hard disk drive 527, magnetic disk drive 528, optical drive 530 are all connected to the system bus 523 via the hard disk interface 532, magnetic disk drive interface 533 and an optical drive interface 534, respectively. Drives and the corresponding computer storage media are non-transitory, and non-volatile storage means of computer instructions, data structures, program modules and other data of a personal computer 520. This description reveals the implementation of a system, which uses a hard disk, removable magnetic disk 529 and a removable optical disk 531, but it should be understood that the use of other types of computer storage media that can store data in computer readable form (solid state disks, cassette tape, flash drive or other nonvolatile memory, digital disks, Bernoulli cartridges, random-access memory (RAM), read-only memories (ROM), etc.) is possible.

Some of the software modules, amongst which may be an operating system 535, are stored on a hard disk, magnetic disk 529, optical disk 531, ROM 524 or RAM 525. A computer 520 has a file system 536, which stores the operating system 535 and additional software applications 537, other program modules 538 and program data 539. The user has the ability to enter commands and information into a personal computer 520 through input devices (keyboard 540, Mouse 542). Other input devices may be (not shown): microphone, joystick, game console, satellite dish, scanner, etc. Such an input device are usually connected to the processor 521 through a serial port 546, which in turn is connected to the system bus, but may be connected by other means, such as a parallel port, game port or universal serial bus (USB). A monitor 547 or other type of display device is also connected to the system bus 523 via an interface such as a video adapter 548. In addition to the monitor 547, personal computer can be equipped with other peripheral output devices (not shown), such as speakers and printer, etc.

Personal computer 520 generally operates in a networked environment, using a logical connection to one or more remote computers 549. A remote computer (or computers) 549 is/are the same as personal computers, servers, routers, network stations, peering devices or another network host, and usually, have most or all of the elements previously described in the description of the substance of a personal computer 520, shown in FIG. 5, but only as a storage device 550 with applications 537. Logical connections include a local area network (LAN) 551 and wide area network (WAN) 552, such networks are common office equipment, and are also used in corporate computer networks, company intranets and the Internet.

When using LAN networks, a personal computer 520 is connected to LAN 551 via a network adapter or interface 553. When using the WAN networking, personal computer 520 has a modem 554 or other means of communication with the global computer network 552, such as the Internet. A modem 554, which may be internal or external, is connected to the system bus 523 via a serial port 546. In a networked environment software modules of exposed personal computers 520, or parts of such programs, are stored in remote storage devices. It should be pointed out that the network connections are merely illustrative and are not required to display the exact network configuration, network, i.e., in fact, there are other ways of establishing a logical connection, other technical means of communication of one computer to another.

It should be noted that aspects of the invention may be implemented using a computer system that is a subset of the general-purpose computer system described above. For instance, the computer system may be a blade server having a relatively limited set of input/output facilities. The computer system may also be implemented as an embedded system operating on a microcontroller digital signal processor, application-specific integrated circuit, field programmable gate array, or the like, provided that the system includes sufficient input/output facilities to enable it to interface with a subject computer system being managed or with other computing devices.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features;

rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An automated computer-implemented method for protecting against a malicious set of program instructions that are executable by a process virtual machine, the process virtual machine comprising program instructions executable on a computer system having a hardware platform and an operating system, the method comprising:
   augmenting, by an automated augmentation process executing on the computer system, the program instructions of the process virtual machine to establish an exception monitoring module within the process virtual machine;
   executing, via the process virtual machine, the subject set of program instructions;
   detecting, by the exception monitoring module, an exception occurring as a result of the execution of the subject set of program instructions, wherein the exception represents an occurrence of an event determined as having potential to violate a predefined security policy;
   in response to a detection of an occurrence of the exception, gathering, by the exception monitoring module, context information from the process virtual machine, the context information representing circumstances surrounding the occurrence of the exception;
   providing, by the exception monitoring module, the context information to be subjected to analysis for a presence of the malicious set of program instructions; and
   determining, by the exception monitoring module, based on a result of the analysis, whether to permit further execution of the subject set of program instructions by the process virtual machine.

2. The method of claim 1, further comprising:
   in response to a detection of an occurrence of the exception, stopping operation of the process virtual machine to prevent further execution of the subject set of program instructions; and
   in response to a result of the analysis being indicative of an absence of malicious code from the subject set of program instructions, re-starting operation of the process virtual machine.

3. The method of claim 1, further comprising:
   in response to a detection of an occurrence of the exception, stopping operation of the process virtual machine to prevent further execution of the subject set of program instructions; and
   in response to a result of the analysis being indicative of a presence of malicious code in the subject set of program instructions, terminating operation of the process virtual machine.

4. The method of claim 1, wherein the augmenting is performed after initiation of execution of the program instructions of the process virtual machine.

5. The method of claim 1, wherein the augmenting is performed prior to initiation of execution of the program instructions of the process virtual machine.

6. The method of claim 1, wherein in the augmenting, specialized code for implementing the exception monitoring module is inserted into an existing security manager portion of the process virtual machine.

7. The method of claim 1, wherein the augmenting includes function overloading of one or more existing functions of the process virtual machine.

8. The method of claim 1, wherein in providing the context information, the circumstances surrounding the exception that are provided include information indicative of a cause of the exception.

9. The method of claim 1, wherein in providing the context information, the circumstances surrounding the exception that are provided include information indicative of events preceding the occurrence of a critical event identified as the exception.

10. The method of claim 1, further comprising:
    receiving, by an analysis module executing, on the computer system, the context information; and
    determining, by the analysis module, whether the context information is associated with malicious code.

11. The method of claim 10, wherein the determining whether the context information is associated with malicious code includes comparing the context information against a set of at least one predefined template representing malicious activity.

12. A system for protecting against malicious functionality of a subject set of program instructions, the system comprising:
    a computer system having a hardware platform and an operating system executable on the hardware platform;
    a process virtual machine module executable on the computer system that, when executed, forms a virtual execution environment in which the subject set of program instructions are executable; and
    a control module executable on the computer system that, when executed, augments the process virtual machine to insert an exception monitoring module configured to:
        detect an exception occurring as a result of execution of the subject set of program instructions, wherein the exception represents an occurrence of an event determined as having potential to violate a predefined security policy;
        in response to a detection of an occurrence of the exception, gather context information from operation of the process virtual machine representing circumstances surrounding the occurrence of the exception;
        provide the context information to be subjected to analysis for a presence of the malicious code; and
        determine, based on a result of the analysis, whether to permit further execution of the subject set of program instructions by the process virtual machine.

13. The system of claim 12, wherein the process virtual machine is configured:
    in response to a detection of an occurrence of the exception, cease operation to prevent further execution of the subject set of program instructions; and to re-start the operation of the process virtual machine in response to a result of the analysis being indicative of an absence of malicious code from the subject set of program instructions.

14. The system of claim 12, wherein the process virtual machine is configured:
in response to a detection of an occurrence of the exception, cease operation to prevent further execution of the subject set of program instructions; and
to terminate operation of the process virtual machine in response to a result of the analysis being indicative of a presence of malicious code in the subject set of program instructions.

15. The system of claim 12, wherein the control module is configured to augment the process virtual machine in response to initiation of execution of the program instructions in the process virtual machine.

16. The system of claim 12, wherein the control module is configured to augment the process virtual machine prior to initiation of execution of the program instructions of the process virtual machine.

17. The system of claim 12, wherein the process virtual machine includes a security manager portion, and wherein the control module is configured to insert specialized code for implementing the exception monitoring module into the security manager portion of the process virtual machine.

18. The system of claim 12, wherein the control module is configured to augment the process virtual machine by function overloading one or more existing functions of the process virtual machine.

19. The system of claim 12, wherein the circumstances surrounding the exception include information indicative of a cause of the exception.

20. The system of claim 12, wherein the circumstances surrounding the exception include information indicative of events preceding the occurrence of a critical event identified as the exception.

21. The system of claim 12, further comprising:
an analysis module executable on the computer system, the analysis module configured to obtain the context information, and to determine whether the context information is associated with malicious code.

22. The system of claim 21, wherein the analysis module is configured to compare the context information against a set of at least one predefined template representing malicious activity.

23. An automated computer-implemented system for protecting against a malicious set of program instructions that are executable by a process virtual machine, the process virtual machine comprising program instructions executable on a hardware platform via an operating system, the system comprising:
means for augmenting, by an automated augmentation process executing on the computer system, the program instructions of the process virtual machine to establish an exception monitoring module within the process virtual machine;
means for detecting, by the exception monitoring module, an exception occurring as a result of execution of the subject set of program instructions via the process virtual machine, wherein the exception represents an occurrence of an event determined as having potential to violate a predefined security policy;
means for gathering, in response to a detection of an occurrence of the exception, context information from the process virtual machine, the context information representing circumstances surrounding the occurrence of the exception;
means for providing the context information for analysis to determine a presence of the malicious code; and
means for determining, based on a result of the analysis, whether to permit further execution of the subject set of program instructions by the process virtual machine.

\* \* \* \* \*